US012018469B2

(12) United States Patent
Soberano et al.

(10) Patent No.: US 12,018,469 B2
(45) Date of Patent: Jun. 25, 2024

(54) AUTOMATIC FAUCET WITH REMOTE ACTIVATION

(71) Applicant: AS America, Inc., Piscataway, NJ (US)

(72) Inventors: Eric Soberano, Barnegat, NJ (US);
Karl Torres, Columbus, NJ (US);
Walter Pitsch, Washington, NJ (US);
Sal Gattone, Piscataway, NJ (US)

(73) Assignee: AS America, Inc., Piscataway, NJ (US)

( * ) Notice: Subject to any disclaimer, the term of this patent is extended or adjusted under 35 U.S.C. 154(b) by 149 days.

(21) Appl. No.: 17/707,770

(22) Filed: Mar. 29, 2022

(65) Prior Publication Data
US 2022/0316193 A1    Oct. 6, 2022

Related U.S. Application Data

(60) Provisional application No. 63/170,260, filed on Apr. 2, 2021.

(51) Int. Cl.
*E03C 1/05* (2006.01)
*E03C 1/02* (2006.01)
*F16L 37/138* (2006.01)

(52) U.S. Cl.
CPC .............. *E03C 1/057* (2013.01); *E03C 1/021* (2013.01); *F16L 37/138* (2013.01)

(58) Field of Classification Search
CPC ......... E03C 1/057; E03C 1/021; F16L 37/138
See application file for complete search history.

(56) References Cited

U.S. PATENT DOCUMENTS

| 8,162,236 | B2 * | 4/2012 | Rodenbeck ............. E03C 1/057 |
| | | | 239/447 |
| 8,397,753 | B2 | 3/2013 | Houghton |
| 9,157,548 | B2 | 10/2015 | Walker et al. |
| 9,353,885 | B1 | 5/2016 | Smith et al. |
| 9,644,354 | B2 | 5/2017 | Warsowe et al. |
| 10,047,890 | B2 | 8/2018 | Li |
| 10,227,760 | B2 * | 3/2019 | Horwitz ................. G01F 15/06 |
| 2017/0260722 | A1 | 9/2017 | Horwitz et al. |
| 2019/0085541 | A1 | 3/2019 | Anderson et al. |
| 2019/0177957 | A1 | 6/2019 | Horwitz et al. |
| 2019/0271141 | A1 | 9/2019 | Green |

* cited by examiner

*Primary Examiner* — Janie M Loeppke
(74) *Attorney, Agent, or Firm* — Morrison & Foerster LLP

(57) ABSTRACT

Provided are automatic faucet systems with remote activation and kits for retrofitting existing faucets to include remote activation. Automatic faucets systems with remote activation can include a faucet comprising a faucet body and a faucet spout; an outlet hose in fluid communication with a cold water supply line, a hot water supply line, and the faucet spout; an electromechanical valve fluidly coupled to the outlet hose and configured to control water flow to the faucet spout; an activator separate from the faucet body and configured to be placed in a variety of positions during installation of the faucet system; and a controller configured to receive a first signal from the activator and, in response to the first signal, to control the electromechanical valve to control water flow to the spout.

19 Claims, 4 Drawing Sheets

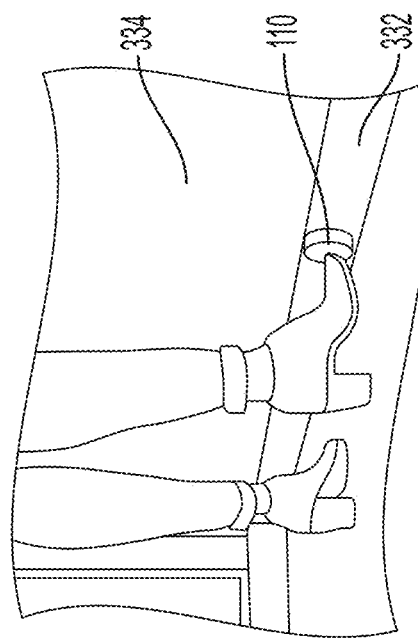
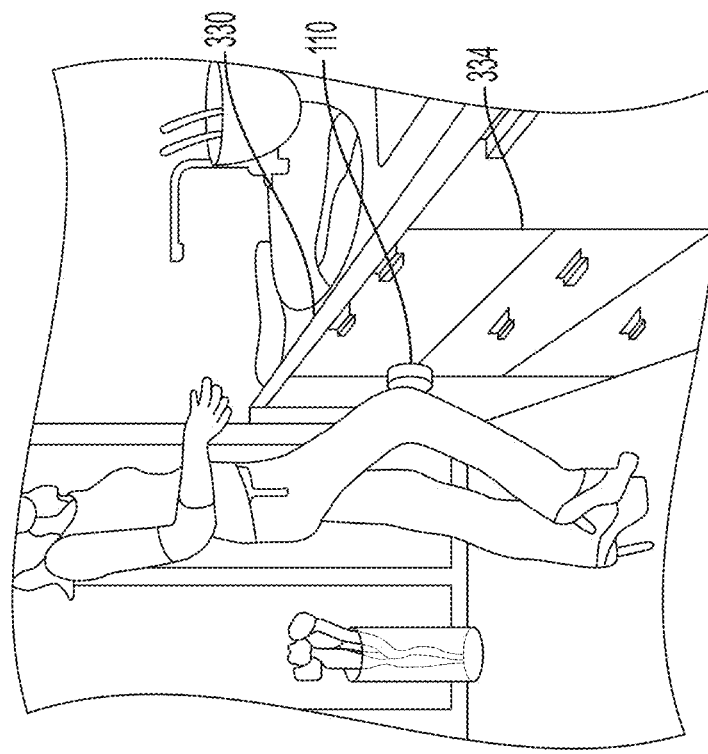

AUTOMATIC FAUCET WITH REMOTE ACTIVATION

CROSS-REFERENCE TO RELATED APPLICATIONS

This application claims the priority of U.S. Provisional Application No. 63/170,260, filed Apr. 2, 2021, the entire contents of which is incorporated herein by reference.

FIELD

The present disclosure relates to automatic faucet assemblies, and more particularly, to automatic faucet assemblies having remote activation.

BACKGROUND

Conventional manual faucet assemblies are activated by simply turning or lifting the faucet handle. This turning or lifting motion opens a manual valve in the faucet assembly that allows water to pass through the faucet and into a sink. An opposite motion can close the valve and deactivate the faucet. Conventional manual faucets require a user to reach and physically touch the handle or knob to open and close the faucet.

Conventional automatic faucet assemblies are activated by a proximity sensor. When the proximity sensor is triggered (e.g., by the presence of a user's hand), an electromechanical valve is opened to allow water to flow through and to a sink. The faucet is deactivated after a certain amount of time or when the proximity sensor no longer detects the presence of a user's hand, for example. Thus, conventional automatic faucets require a user to be able to reach a location proximate to the sensor (usually in the body of the faucet) to trigger the sensor.

SUMMARY OF THE DISCLOSURE

Conventional faucets, such as the conventional manual and automatic faucets described above, can only be activated at a location proximate to the faucet body. For example, in the case of a conventional manual faucet, the faucet can only be triggered by operating the faucet handle or knob, which is typically located proximate to the faucet body. In the case of a conventional automatic faucet, activation occurs at the proximity sensor, which is typically located near or at the base of the faucet body. Accordingly, both conventional manual faucets and conventional automatic faucets are designed to have the user extend a hand to the faucet body.

However, many faucet users may wish to activate a faucet without having to physically touch or otherwise extend a hand to the faucet body. For example, manual faucets operated by many people (e.g., faucets located in public restrooms) may carry a number of germs, bacteria, and/or viruses. In some cases, a faucet user may be physically unable to reach the faucet body with their hand to activate the faucet.

Accordingly, provided herein are faucet systems having remote activation. For example, remote activation can include an activator installed near the floor or at the front edge of a sink. Remote activation allows a user to activate the faucet using a body part other than a hand (e.g., a foot). This can prevent the user from having to physically touch a handle of the faucet to activate it, preventing the spread of germs, bacteria, and/or viruses. Remote activation can also enable a user to use a hand/arm to activate the faucet who cannot otherwise reach the faucet body (e.g., a child, a user having a physical impairment). Accordingly, faucets having remote activation according to embodiments provided herein can allow for more hygienic use and more flexibility in use.

In some embodiments, provided is an automatic faucet system, the automatic faucet system comprising: a faucet comprising a faucet body and a faucet spout; an outlet hose in fluid communication with a cold water supply line, a hot water supply line, and the faucet spout; an electromechanical valve fluidly coupled to the outlet hose and configured to control water flow to the faucet spout; an activator separate from the faucet body and configured to be placed in a variety of positions during installation of the faucet system; and a controller configured to receive a first signal from the activator and, in response to the first signal, to control the electromechanical valve to control water flow to the spout.

In some embodiments of the automatic faucet system, the faucet comprises a manual mixing valve, and the manual mixing valve is configured to be closed when water flows to the faucet spout of the manual faucet.

In some embodiments of the automatic faucet system, the faucet comprises a manual mixing valve, and the manual mixing valve is configured to be open when water flows to the manual faucet.

In some embodiments of the automatic faucet system, the faucet comprises a manual mixing valve, and the manual mixing valve is configured to be open or closed when water flows to the manual faucet.

In some embodiments of the automatic faucet system, the activator is configured to receive a user input.

In some embodiments of the automatic faucet system, in response to the user input, the activator is configured to send the first signal to the controller.

In some embodiments of the automatic faucet system, if the automatic faucet system is installed at a sink above a cabinet, the activator is configured to be installed on a toekick of the cabinet.

In some embodiments of the automatic faucet system, if the automatic faucet system is installed at a sink above a cabinet, the activator is configured to be installed on a face of the cabinet proximate to a front edge of the sink.

In some embodiments of the automatic faucet system, if the automatic faucet system is installed at a sink above a cabinet, the activator is configured to be installed on a face of the cabinet at a location that is from about 25% to about 75% a total distance measured between a bottom edge of the face of the cabinet and a top edge of the face of the cabinet.

In some embodiments of the automatic faucet system, the activator comprises one of a button, a sensor, a switch, or a pedal.

In some embodiments of the automatic faucet system, the activator comprises an infrared sensor, a proximity sensor, a capacitive sensor, a microwave sensor, or an ultrasonic sensor.

In some embodiments of the automatic faucet system, the controller, in response to receiving the first signal, is configured to open the electromechanical valve to allow water to flow to the faucet body.

In some embodiments of the automatic faucet system, the controller is configured to receive a second signal sent from the activator, and, in response to the second signal, is configured to close the electromechanical valve to stop flow of water to the faucet body.

In some embodiments of the automatic faucet system, the controller is configured to close the electromechanical valve after a predetermined amount of time has passed since the controller opened the electromechanical valve in response to the first signal.

In some embodiments of the automatic faucet system, the faucet body comprises a handle or knob configured to control a temperature of water flowing to the faucet body by controlling a manual mixing valve in the faucet body.

In some embodiments of the automatic faucet system, the activator is in wireless communication the controller.

In some embodiments of the automatic faucet system, the activator is in wired electrical communication with the controller.

In some embodiments of the automatic faucet system, the electromechanical valve is in wireless communication the controller.

In some embodiments of the automatic faucet system, the electromechanical valve is in wired electrical communication with the controller.

In some embodiments of the automatic faucet system, the automatic faucet system is configured to operate in an automatic mode and a manual mode.

In some embodiments of the automatic faucet system, when the automatic faucet operates in the automatic mode, a user activates the automatic faucet system with the activator.

In some embodiments of the automatic faucet system, when the automatic faucet operates in the manual mode, a user activates the automatic faucet using a handle or knob configured to control a manual mixing valve.

In some embodiments of the automatic faucet system, the automatic mode is configured to be overridden by a user who activates the automatic faucet with a handle or knob configured to control a manual mixing valve.

In some embodiments of the automatic faucet system, the faucet spout comprises a sprayhead.

In some embodiments, provided is a kit for retro-fitting a manual faucet to an automatic faucet configured to have remote activation, the kit comprising: an electromechanical valve configured to be fluidly coupled to a manual mixing valve of a manual faucet; an activator configured to be placed in a variety of positions separate from the faucet during installation; and a controller configured to be in electronic communication with the electromechanical valve and the activator, wherein the controller is configured to receive a first signal from the activator, and, in response to the first signal, to control the electromechanical valve to control water flow to a faucet spout of the manual faucet.

In some embodiments of the kit, the manual mixing valve is configured to be closed when water flows to the faucet spout of the manual faucet.

In some embodiments of the kit, the manual mixing valve is configured to be open when water flows to the manual faucet.

In some embodiments of the kit, the manual mixing valve is configured to be open or closed when water flows to the manual faucet.

In some embodiments of the kit, the electromechanical valve is configured to be fluidly coupled using a quick connect mechanism.

In some embodiments of the kit, the activator is configured to receive a user input.

In some embodiments of the kit, in response to the user input, the activator is configured to send the first signal to the controller.

In some embodiments of the kit, if the automatic faucet system is installed at a sink above a cabinet, the activator is configured to be installed on a toekick of the cabinet.

In some embodiments of the kit, if the automatic faucet system is installed at a sink above a cabinet, the activator is configured to be installed on a face of the cabinet proximate to a front edge of the sink.

In some embodiments of the kit, if the automatic faucet system is installed at a sink above a cabinet, the activator is configured to be installed on a face of the cabinet at a location that is from about 25% to about 75% a total distance measured between a bottom edge of the face of the cabinet and a top edge of the face of the cabinet.

In some embodiments of the kit, the activator comprises one of a button, a sensor, a switch, or a pedal.

In some embodiments of the kit, the activator comprises an infrared sensor, a proximity sensor, a capacitive sensor, a microwave sensor, or an ultrasonic sensor.

In some embodiments of the kit, the controller, in response to receiving the first signal, is configured to open the electromechanical valve to allow water to flow to the faucet body.

In some embodiments of the kit, the controller is configured to receive a second signal sent from the activator, and, in response to the second signal, is configured to close the electromechanical valve to stop flow of water to the faucet body.

In some embodiments of the kit, the controller is configured to close the electromechanical valve after a predetermined amount of time has passed since the controller opened the electromechanical valve in response to the first signal.

In some embodiments of the kit, the faucet body comprises a handle or knob configured to control a temperature of water flowing to the faucet body by controlling a manual mixing valve in the faucet body.

In some embodiments of the kit, the activator is in wireless communication the controller.

In some embodiments of the kit, the activator is in wired electrical communication with the controller.

In some embodiments of the kit, the electromechanical valve is in wireless communication the controller.

In some embodiments of the kit, the electromechanical valve is in wired electrical communication with the controller.

In some embodiments of the kit, the automatic faucet system is configured to operate in an automatic mode and a manual mode.

In some embodiments of the kit, when the automatic faucet operates in the automatic mode, a user activates the automatic faucet system with the activator.

In some embodiments of the kit, when the automatic faucet operates in the manual mode, a user activates the automatic faucet using a handle or knob configured to control a manual mixing valve.

In some embodiments of the kit, the automatic mode is configured to be overridden by a user who activates the automatic faucet with a handle or knob configured to control a manual mixing valve.

In some embodiments, any one or more of the features, characteristics, or elements discussed above with respect to any of the embodiments may be incorporated into any of the other embodiments mentioned above or described elsewhere herein.

BRIEF DESCRIPTION OF THE FIGURES

The disclosure described herein is illustrated by way of example and not by way of limitation in the accompanying figures. For simplicity and clarity of illustration, features illustrated in the figures are not necessarily drawn to scale.

For example, the dimensions of some features may be exaggerated relative to other features for clarity. Further, where considered appropriate, reference labels have been repeated among the figures to indicate corresponding or analogous elements.

FIGS. 3A and 3B illustrate possible installation positions of an activator of an automatic faucet system having remote activation, according to some embodiments.

DETAILED DESCRIPTION OF THE DISCLOSURE

Figure 1A:
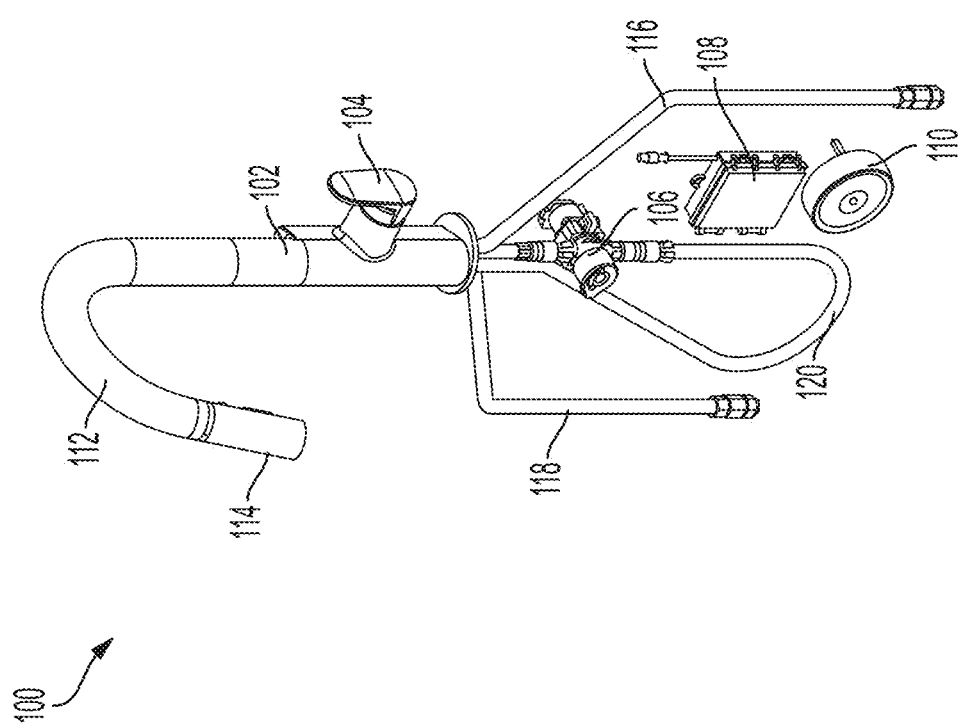
FIGS. 1A and 1B illustrate a perspective view and a partial view respectively, of a faucet system having remote activation, according to some embodiments.

Described herein are faucet systems having remote activation. Also described are remote activation kits for retro-fitting existing faucets to include remote activation. As described above, conventional faucets require a user to physically reach a location proximate to the faucet body (e.g., a handle, a proximate sensor) to activate and/or deactivate the faucet. However, faucets that require a user to manually lift or turn a handle can encourage the spread of germs, bacteria, and/or viruses. Additionally, any faucet that requires a user to physical reach the faucet body (or a location proximate to the faucet body) cannot be activated by a user who has certain physical characteristics (e.g., a child, an amputee, a quadriplegic). As provided herein, faucet systems having remote activation and remote activation kits for retro-fitting an existing faucet can allow a user to activate the faucet at a location remote from the faucet body. This can both help prevent the spread of germs, bacteria, and/or viruses and help users who cannot physically reach the faucet body otherwise activate the faucet.

The faucet systems having remote activation can be installed as a new faucet system in any residential or commercial sink (e.g., kitchen sink, bathroom sink). The remote activation kits can be used to retrofit an existing manual or automatic faucet to include remote activation. To successfully use the remote activation kit to retrofit the existing faucet, the remote activation kit may require that the existing faucet include a quick connect coupling. For example, an existing faucet may include a quick connect coupling such as that which is described in U.S. Pat. No. 10,047,890.

The faucet systems having remote activation and/or the remote activation kits, described in detail below, include an activator. The activator can include a sensor, a button, a switch, a pedal, or any other activation switch known in the art. Suitable sensors can include one or more of infrared sensors, proximity sensors, capacitive sensors, microwave sensors, ultrasonic sensors, etc. The activator can be positioned at a variety of locations. For example, the activator can be located at or near the floor such that it can be triggered with a user's foot. In some embodiments, the activator can be located at the front of the sink, allowing a user to activate the faucet with a hand or elbow without having to reach across the sink to the faucet body. In some embodiments, the activator may be located on the face of a cabinet below the sink.

In some embodiments, faucet systems with remote activation and/or remote activation kits for retro-fitting an existing faucet can include an electromechanical valve (e.g., a solenoid valve). An electromechanical valve converts electrical energy to mechanical energy by creating a magnetic field from an electric current and using the magnetic field to create a physical (e.g., linear) motion. Triggering the activator can provide an electric current to the electromechanical valve, which can then open the valve by using the magnetic field to create a physical motion (e.g., causing a plunger in the valve to move and allow water flow through the valve).

Faucet systems and/or remote activation kits provided herein may also include a controller. The controller may be installed under the sink and can include a logical processer circuit board. The controller can receive an input from the activator and, based on the input, control the electromechanical valve of the faucet assembly. The controller receives power from a power source, which can include AC power, DC power, or a combination of AC and DC power. The controller may be in wired communication or in wireless communication with the electromechanical valve and/or the activator.

Provided below are faucet systems having remote activation and remote activation kits for retro-fitting existing manual and automatic faucets.

Faucet Systems with Remote Activation

As explained above, conventional faucets require a user to reach the body of a faucet to activate the faucet. Faucets that require a user to touch and/or manually operate a handle of the faucet assembly to activate the faucet can encourage the spread of germs, bacteria, and/or viruses. Even conventional touchless faucets require a user to reach the faucet body (or a location proximate to the faucet body) to activate the faucet (e.g., via a presence sensor). However, this precludes people who cannot physically reach the faucet body of the faucet assembly for any of a variety of reasons. However, faucet systems provided herein include remote activation. Remote activation may prevent a user from having to touch any part of the faucet assembly (e.g., faucet body, handle), thus minimizing the possibility of spreading germs, bacteria, and/or viruses. Remote activation can also enable users to activate the faucet without needing to reach the faucet itself, increasing accessibility of the faucet.

FIG. 1A illustrates a faucet system 100 with remote activation according to some embodiments. As shown, faucet system 100 includes a faucet body 102, faucet spout 112, sprayhead 114, handle 104, cold water supply 116, hot water supply 118, outlet hose 120, an electromechanical valve 106, a controller 108, and an activator 110. Each component is described in detail below.

Faucet body 102 may be an automatic faucet for any household or commercial use. For example, faucet body 102 may be designed for use as a kitchen faucet or a bathroom faucet. After passing through the faucet body 102, water exits the faucet at faucet spout 112. In some embodiments, faucet spout 112 includes a pull-out sprayhead 114.

In some embodiments, faucet system 100 may include handle 104 or a knob. In some embodiments, the automatic feature of faucet system 100 may be turned off such that faucet system 100 may be operated in manual mode such that the faucet may only be activated using handle 104 and not activator 110. In some embodiments, handle 104 may be configured to control the temperature of the water passing through faucet body 102. For example, much like a conventional manual faucet, handle 104 may be adjusted to a position that controls the amount of hot water and the amount of cold water coming from the respective hot and cold water inlets and to a manual mixing valve. In some embodiments, a dial may be included on faucet body 102 to control the temperature of the water passing through a manual mixing valve and to the faucet. In some embodiments, if a user operates faucet system 100 with handle 104 (i.e., instead of operating the faucet using activator 110), the handle operation would open or close a manual mixing valve within the faucet body 102, and override the remote activation features. For example, a user can bypass the activator 110 and operate faucet system 100 using handle 104 to open and close the manual mixing valve within the faucet body 102. In some embodiments, if faucet system 100 is "on" with water running through faucet system 100 and into a sink, a user can turn faucet system 100 "off" by operating handle 104. In some embodiments, handle 104 may be connected to controller 108. In some embodiments, faucet system 100 can be activated and/or deactivated using activator 110 while handle 104 is in a "closed" position. In some embodiments, faucet system 100 can be activated and/or deactivated using activator 110 while handle 104 is in an "open" position.

Cold water supply 116 comprises a conduit that transports cold water from the cold water supply to a manual mixing valve. Hot water supply 118 is a conduit that transports hot water from the hot water supply to the manual mixing valve.

Once the hot water and cold water are mixing by the manual mixing valve, the mixed water passes through outlet hose 120. Electromechanical valve 106 may be in fluid communication with outlet hose 120. Outlet hose 120 transports water to and is fluidly coupled to faucet spout 114.

Electromechanical valve 106 can control how much water passes from the manual mixing valve, through electromechanical valve 106, and to the faucet body. In some embodiments, electromechanical valve 106 may convert electric energy to mechanical energy. For example, a solenoid valve is one example of an electromechanical valve that would be suitable for the faucet assemblies provided herein. A solenoid valve is an electrically controlled valve with a solenoid, or an electric coil. The electric coil can include a moveable ferromagnetic core (or plunger) in the center of the coil. When an electric current is applied to the coil, a magnetic field is created. This magnetic field causes the plunger to move and open an orifice in the valve. The open orifice can allow water to pass through the solenoid valve and to the faucet body. When the electric current is no longer applied to the coil, the magnetic field no longer exists. In this state, the plunger returns to a resting position, in which it closes the orifice, preventing the water from flowing through the valve. In some embodiments, electromechanical valve 106 may include a bypass switch. When the bypass switch is engaged, it keeps electromechanical valve 106 in an open position. When electromechanical valve 106 is held in an open position (i.e., when the bypass switch is "on"), the faucet system 100 is converted from an automatic faucet with remote activation to a manual faucet. For example, this can allow faucet system 100 to be used in the event of a power failure. In some embodiments, faucet system 100 may include a sensor that can allow the user to switch faucet system 100 from automatic to manual, and vice versa.

In some embodiments, the amount of cold water and hot water that passes through electromechanical valve 106 is controlled by a temperature controller. For example, the temperature controller can include a handle (e.g., handle 104) or a knob that controls a manual mixing valve of the faucet system.

Controller 108 may be configured to control the on/off status of the faucet by controlling activator 110 and/or electromechanical valve 106. For example, to turn the faucet "on", controller 108 may be configured to receive a signal from activator 110 when activator 110 has been triggered "on". When controller 110 receives a signal from activator 100, it is configured to send a signal to electromechanical valve 106 to apply an electric current to the valve to open it (e.g., controller 108 sends an "open" signal to electromechanical valve 106). As explained above, an electric current applied to electromechanical valve 106 opens electromechanical valve 106, allowing water to flow through the valve and to the faucet. In some embodiments, controller 108 can also control when the faucet is turned "off." For example, when activator 110 is triggered "off," a corresponding signal is sent to controller 108. Controller 108 receives the "off" signal and communicates to electromechanical valve 106 to return to a resting position and stop sending water to the faucet (e.g., controller 108 sends a "close" signal to electromechanical valve 106). This may include ceasing the electric current that was being applied to electromechanical valve 106 to open the valve and allow water to pass through. In some embodiments, controller 108 may control electromechanical valve 106 to stop sending water to the faucet after a predetermined amount of time. For example, circuitry of controller 108 may be configured to stop sending water to the faucet after 10, 12, 15, 18, or 20 seconds. In some embodiments, a user may be able to control the predetermined amount of time. Controller 108 may be powered with AC power, DC power, or a combination of AC and DC power. In some embodiments, controller 108 may include a battery box. In some embodiments, controller 108 may be switched off, allowing the faucet to be operated in manual mode. In some embodiments, controller 108 may be configured to convert an analog signal (e.g., received from activator 110) to a digital signal (e.g., sent to electromechanical valve 106).

Activator 110 comprises a sensor, a button, a switch, a pedal, or any other activation switch known in the art. Suitable sensors can include one or more of infrared sensors, proximity sensors, capacitive sensors, microwave sensors, ultrasonic sensors, etc. Activator 110 may be installed in any of a variety of locations as desired by the user. Activator 110 is configured to receive a user input and send a signal to controller 108. For example, if activator 110 is a button, a user may push the button to send a signal to controller 108. If activator 110 is an infrared or proximity sensor, a user may extend a hand or foot, for example, in front of the sensor to send a signal to controller 108. If activator 110 is a pedal, a user may push the pedal with a hand or a foot, for example, to send a signal to controller 108. As explained above, once a user triggers, or provides an input to activator 110, a signal is sent to controller 108. Controller 108 receives the signal and controls electromechanical valve 106 to open and allow water to pass through the valve and to the faucet. In some embodiments, a user may have to provide a second input to activator 110 to turn the faucet "off." For example, the user may have to push the button or pedal or extend a hand/foot to the infrared sensor or proximity sensor to send a second signal to controller 108. When controller 108 receives the second signal, it can close electromechanical valve 106 such that water stops flowing to the faucet. In some embodiments, if the user does not provide a second input to activator 110, faucet 100 will be "on" indefinitely. In some embodiments, controller 108 may be configured to turn faucet 100 "off" after a predetermined amount of time such that faucet 100 is not "on" indefinitely. In some embodiments, controller 108 may be configured to turn "off" the faucet in response to both a user input and after a predetermined amount of time. For example, controller 108 may be configured to turn "off" faucet 100 in response to receiving a signal from activator 110, or controller 108 may be configured to turn "off" faucet 100 after a predetermined time of 15 seconds, whichever comes first. In some embodiments, a user may be able to indicate the type of water stream flowing from a sprayhead of the faucet using activator 110. For example, a user may press activator 110 once for a stream of water, and twice for a spray.

In some embodiments, activator 110 may be installed on a horizontal surface. In some embodiments, activator 110 may be installed on a vertical surface. In some embodiments, activator 110 may be installed on an inclined surface. In some embodiments, activator 110 may be installed near the floor. For example, activator may be installed on a kick plate (e.g., toekick) of a cabinet, or at the bottom of a cabinet door, such that a user can trigger activator 110 with a toe, foot, etc. In some embodiments, activator 110 may be positioned approximately halfway up the face of a cabinet. For example, activator 110 may be positioned such that it can easily be activated using a knee. In some embodiments, activator 110 may be positioned near the edge of a countertop, at the front of the sink, or on a face of the cabinet near the top of the cabinet. Positioning activator 110 near the edge of the countertop and/or near the front of the sink or the top front face of the cabinet may increase the accessibility of the faucet for a user who cannot otherwise reach the faucet body and/or adjacent handle/knob to turn the faucet on and off, which is necessary for conventional manual and conventional automatic faucets. In some embodiments, activator 110 may be positioned at the back of the sink and/or near the base of the faucet body. In some embodiments, activator 110 may be positioned on a backsplash or on a deck of the sink system. In some embodiments, activator 110 may be positioned at a height that is greater than that of the faucet body. In some embodiments, activator 110 may be removably installed. For example, activator 110 may be removably installed at a first location and later moved to a second location. Various location installation positions may be necessary to accommodate different needs (e.g., physical abilities) of different users.

In some embodiments, activator 110 may be wired directly to electromechanical valve 106, foregoing the need for controller 108. In some embodiments, electromechanical valve 106 and/or activator 110 may be in wired or in wireless communication with a circuit board of controller 108. The circuitry of the circuit board can include circuitry for wireless communications, such as Bluetooth, WiFi, ZigBee, XBee, FM, etc.

Figure 1B:
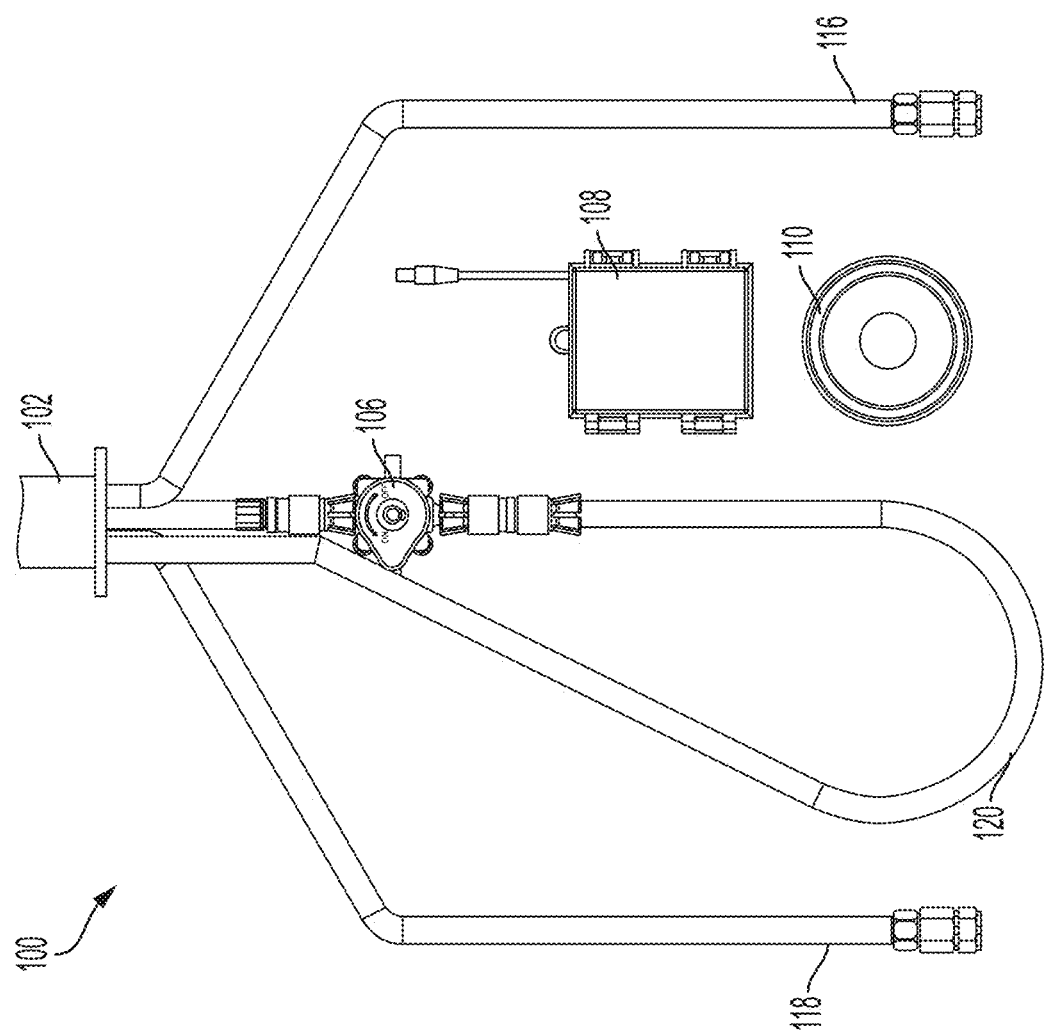

FIG. 1B is a partial view of a faucet system having remote activation, according to some embodiments. As shown, the system 100 of FIG. 1B includes a portion of faucet body 102, electromechanical valve 106, controller 108, activator 110, hot water supply line 118, cold water supply line 116, and outlet hose 120.

The portion of faucet body 102 may include any features of faucet body 102 described with respect to faucet system 100 of FIG. 1A. For example, faucet body 102 may be any residential or commercial kitchen or bathroom faucet. In some embodiments, faucet body 102 may include a handle and/or a pull-down spray head. In some embodiments, faucet body 102 may include a temperature control. For example, a user may set the temperature control located on faucet body 102 to a suitable temperature. For example, a temperature control may be manually set using a handle or a dial of a faucet, which can in turn control a manual mixing valve within the faucet body. A user may position/set the handle or dial to a suitable temperature as desired by the user. Once the faucet is turned "on" by triggering activator 110, the water passing through the faucet will be temperature-controlled according to the setting of the temperature control.

Electromechanical valve 106 may include any features of electromechanical valve 106 described with respect to faucet system 100 of FIG. 1A. For example, electromechanical valve 106 may be a solenoid valve. In some embodiments, electromechanical valve 106 may control the water that flows from the manual mixing valve (by way of hot water supply 118 and cold water supply 116) and to the faucet. In some embodiments, faucet system 100 may be switched from automatic mode to a manually-operated faucet. For example, electromechanical valve 106 may include a switch allowing a user to switch the faucet from automatic to manual mode. The automatic faucet may operate in manual mode if it includes a handle/knob and a manual mixing valve.

Controller 108 may include any features of controller 108 as described with respect to faucet system 100 of FIG. 1A. For example, controller may be configured to control activator 110 and electromechanical valve 106. Controller 108 may be configured to receive a signal from activator 110 in response to a user input. Controller 108 may then be configured, in response to receiving an input from activator 110, to control electromechanical valve 106. Controller 108 may be configured to turn faucet system 200 "on" and/or "off" in response to one or more signals received from activator 110. In some embodiments, controller 108 may be configured to turn faucet system 200 "off" after a predetermined amount of time has passed from when controller 108 has turned faucet system 200 "on." Controller 108 may be powered with AC power, DC power, or a combination of AC and DC power. In some embodiments, controller 108 may include a battery box. In some embodiments, controller 108 may be switched off, allowing the faucet to be operated in manual mode. In some embodiments, controller 108 may be configured to convert an analog signal to a digital signal.

Activator 110 may include any features of activator 110 as described with respect to faucet system 100 of FIG. 1A. For example, activator 110 may include any of a sensor, a button, a switch, a pedal, or any other activation switch known in the art. Suitable sensors can include one or more of infrared sensors, proximity sensors, capacitive sensors, microwave sensors, ultrasonic sensors, etc. In some embodiments, activator 110 may be used to turn faucet system 200 "on". In some embodiments, activator 110 may be configured to turn faucet system 200 "off" When triggered (i.e., when a user pushes the button, extends a hand, foot, etc. in front of the infrared or proximity sensor, presses the pedal, etc.), activator 110 sends a signal to controller 108. Controller 108 receives the signal and, in response to the signal, controls electromechanical valve 106 to turn the faucet system 200 "on" or "off."

Hot water supply 118 may include any features of hot water supply 118 as described with respect to faucet system 100 of FIG. 1A. Cold water supply 116 may include any features of cold water supply 116 as described with respect to faucet system 100 of FIG. 1A. Hot water supply 118 and cold water supply 116 send hot water and cold water, respectively, to a manual mixing valve of the faucet.

Figure 2:
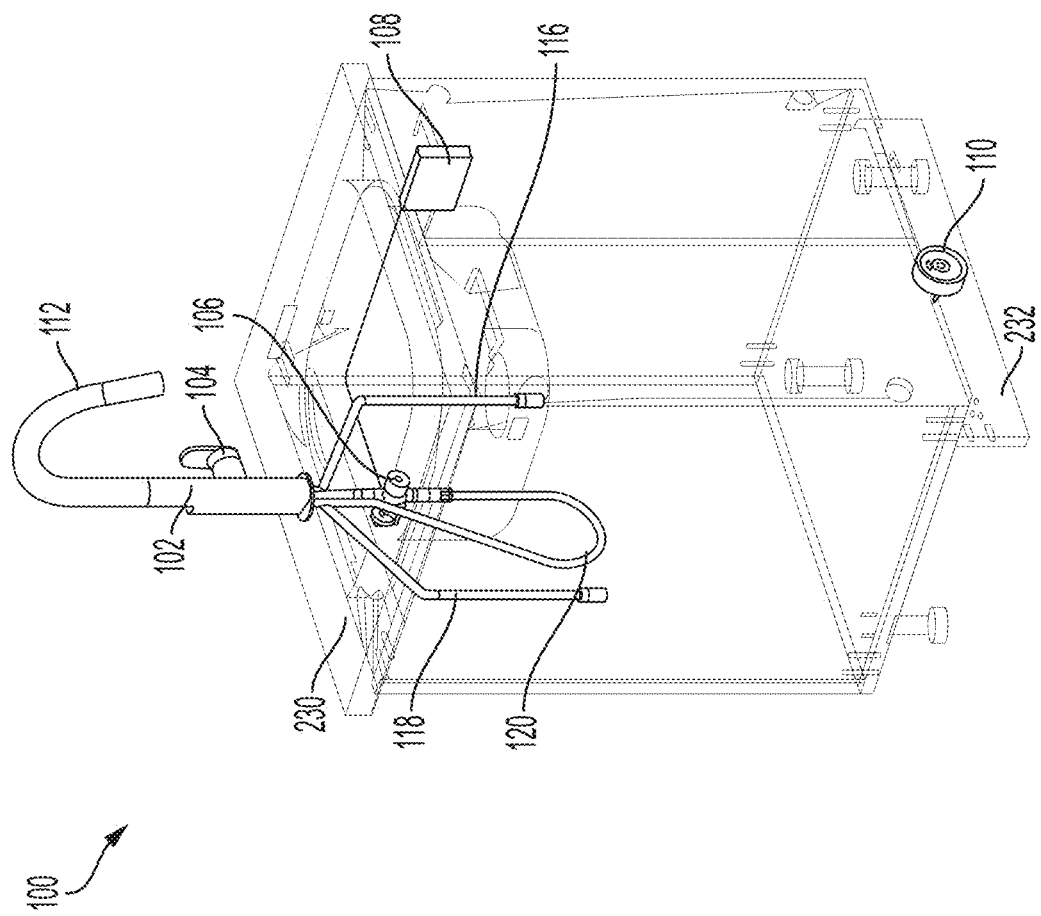
FIG. 2 illustrates a perspective view of a faucet system installed at a sink having remote activation, according to some embodiments.

FIG. 2 shows a faucet system 100 installed at a sink having remote activation, according to some embodiments. As shown, faucet system 100 includes faucet body 102, faucet spout 112, handle 104, electromechanical valve 106, controller 108, activator 110, hot water supply 118, cold water supply 116, outlet hose 120, deck 230, and toekick 232.

Faucet body 102 may include any features of faucet body 102 as described with respect to faucet body 100 of FIG. 1A and/or faucet body 102 as described with respect to faucet system 100 of FIG. 1B. In some embodiments, faucet body 102 may include faucet spout 112 and/or a pull-out sprayhead.

In some embodiments, faucet system 100 may include handle 104. Handle 104 may include any features of handle 104 as described with respect to faucet system 100 of FIG. 1A. For example, handle 104 may be used when faucet system 100 is switched into manual mode by opening and/or closing a manual mixing valve within the faucet body. In some embodiments, handle 104 may be used to set the temperature of water passing through electromechanical valve 106 and to faucet body 102.

Faucet system 100 can include electromechanical valve 106. Electromechanical valve 106 can include any features of electromechanical valve 106 as described with respect to faucet system 100 of FIG. 1A and/or any features of electromechanical valve 106 as described with respect to faucet system 100 of FIG. 1B. In some embodiments, electromechanical valve 106 may include a manifold such that outlet hose 120 of faucet system 100 can couple to electromechanical valve 106 using a quick connection.

Controller 108 is shown positioned against a side wall of the cabinet under the sink. This is only one possible installation position in which controller 108 may be installed. In some embodiments, controller 108 can be installed under the sink and/or in a cabinet (e.g., out of sight). In some embodiments, controller 108 may be installed on a vertical surface or on a horizontal surface. In some embodiments, controller 108 includes a housing in which the circuitry of controller 108 is housed. A housing can protect the circuitry from the elements. In some embodiments, the housing of controller 108 may be waterproof. In some embodiments, the housing of controller 108 may include a watertight seal to protect the circuitry of controller 108 from any potential water. As shown, controller 108 may be in wired communication with electromechanically valve 106. Controller 108 may be in wireless communication with activator 110. Controller 108 may include any features of controller 108 as described with respect to FIG. 1A and/or controller 108 as described with respect to FIG. 1B.

Activator 110 may include any features of activator 110 as described with respect to faucet system 100 of FIG. 1A and/or activator 110 as described with respect to faucet system 100 of FIG. 1B. As shown, activator 110 is positioned at the base of the cabinet near the floor (i.e., on a toekick or kick plate). Such positioning may allow for a user to activate faucet system 100 with a toe or foot, for example. However, the position of activator 110 is only one possible location at which activator may be positioned. Activator 110 may be positioned anywhere that is most ideal to the user. For example, activator 110 may be positioned on the front of the cabinet at approximately knee height, allowing a user to easily operate activator 110 with a knee. In some embodiments, activator 110 may be positioned on the countertop or deck 230. In some embodiments, activator 110 may be removably affixed to a surface.

Hot water supply 118 may comprise any features of hot water supply 118 as described with respect to faucet system 100 of FIG. 1A and/or hot water supply 118 as described with respect to faucet system 100 of FIG. 1B. Cold water supply 116 may comprise any features of cold water supply 116 as described with respect to faucet system 100 of FIG. 1A and/or cold water supply 116 as described with respect to faucet system 100 of FIG. 1B.

In some embodiments, hot water supply 118 and cold water supply 116 deliver hot and cold water, respectively, to a manual mixing valve. The manual mixing valve may be located within faucet body 102. From the mixing valve, the mixed water travels through electromechanical valve 106, through outlet hose 120, and to the faucet spout 114. In some embodiments, faucet spout 112 may include a pull-out sprayhead.

Faucet system 100 may be installed at a sink surrounded by deck 230. For example, deck 230 may comprise a countertop. Activator 110 may be installed at any location on a surface of deck 230.

Faucet system 100 may be installed at a sink set within a cabinet. In some embodiments, the cabinet may comprise a toekick 232 at the bottom face of the cabinet, below the cabinet door. In some embodiments, activator 110 may be installed on a surface of toekick 232.

FIGS. 3A and 3B show possible installation locations for activator 110. As shown, FIG. 3A includes activator 110, deck 330, and cabinet face 334. FIG. 3B includes activator 110, cabinet face 334, and toekick 332. Each Figure is described in detail below.

FIG. 3A shows activator 110 positioned between the floor and deck 330 (e.g., countertop). In some embodiments, this positioning may be desired if a user wishes to trigger activator 110 using a knee, for example. By triggering activator 110 with a knee, a user can both use the faucet without touching any surface of the faucet system and without having to extend a hand, for example, all the way to the back of the sink to the base of the faucet body. In some embodiments, activator 110 may be installed on a cabinet face 334 at a location that is from about 25% to about 75% a total distance measured between a bottom edge of cabinet face 332 and a top edge of cabinet face 334. In some embodiments, activator 110 may be installed on a cabinet face 334 at a location that is less than about 75%, about 60%, about 50%, or about 40% a total distance measured between a bottom edge of cabinet face 332 and a top edge of cabinet face 334. In some embodiments, activator 110 may be installed on a cabinet face 334 at a location that is greater than or equal to about 25%, about 40%, about 50%, or about 60% a total distance measured between a bottom edge of cabinet face 332 and a top edge of cabinet face 334. Activator 110 may be removably affixed to cabinet face 334 such that it can be moved to a different location at any given time.

FIG. 3B shows activator 110 positioned on a toekick 332 of a cabinet. Here, activator 110 is positioned below a bottom edge of cabinet face 334 on toekick 332 such that a user can trigger activator 110 with a toe and/or foot. By triggering activator 110 with a toe or foot, a user can both use the faucet without touching any surface of the faucet system and without having to extend a hand, for example, to the back of the sink to the base of the faucet body. Activator 110 may be removably affixed to toekick 332 such that it can be moved to a different location at any given time.

Remote Activation Kits for Retrofitting an Existing Faucet to Include Remote Activation In addition to the faucet systems having remote activation provided above, also provided are remote activation kits that can convert, or retrofit, an existing faucet to include an activator. In some embodiments, existing faucets that can be modified to include an activator have quick connection hose connections. In some embodiments, the existing faucet system might include an electromechanical valve in fluid communication with the outlet hose transporting water from the manual mixing valve to the faucet of the faucet system using quick connection hose connections. In some embodiments, one or more quick connection coupling of the existing faucet assembly may include a quick connection coupling such as that which is described in U.S. Pat. No. 10,047,890.

In some embodiments, a remote activation kit can be used to convert an existing automatic faucet to include remote activation. In some embodiments, a remote activation kit can be used to convert an existing manual faucet to include remote activation. In some embodiments, the remote activation kit may include an activator, a controller, and an electromechanical valve.

In some embodiments, a kit for retrofitting an existing faucet to include remote activation may include an activator. For example, an activator of a retrofit kit may include any features of activator 110 as described with respect to faucet assembly 100 of FIG. 1A, activator 110 as described with respect to faucet assembly 100 of FIG. 1B, and/or activator 110 as described with respect to faucet assembly 100 of FIG. 2. The activator can include a sensor, a button, a switch, a pedal, or any other activation switch known in the art. Suitable sensors can include one or more of infrared sensors, proximity sensors, capacitive sensors, microwave sensors, ultrasonic sensors, etc. The activator may be configured to be in wired or in wireless communication with an existing controller (e.g., such as a controller of a conventional automatic faucet). In some embodiments, the activator may configured to be in wired or in wireless communication with a controller of the kit. Once retrofitted, a user would be able to activate (and/or deactivate) the faucet with the activator. The activator would be configured to receive an input from a user to trigger the activator to send a signal to the controller. For example, if the activator is a pedal, the user input may include pressing the pedal (e.g., with a foot or a hand). If the activator includes a sensor, such as a proximity sensor or an infrared sensor, the user input may include waving or presenting an item or a body part (e.g., a hand or a foot) in front of the sensor. If the activator is a button, the user input can include a user pressing the button.

The activator, and the user input configured to activate the activator, can override any existing activation mechanism in the existing faucet. For example, if the existing faucet is a manual faucet, the activator may activate (or deactivate) the faucet. In some embodiments, a handle of a manual faucet must remain in an open position to allow for the activator to activate the faucet. In some embodiments, a handle of the existing faucet may be in an open or in a closed position when the faucet is activated using the activator. For an existing automatic faucet, the activator may be configured to override the existing sensor (e.g., proximity sensor or infrared sensor likely located in the faucet body). In some embodiments, if the faucet has been activated using the activator, the faucet may be deactivated using conventional means. For example, a conventional manual faucet may be deactivated by closing a handle, or a conventional automatic faucet may be deactivated by triggering a proximity or infrared sensor in the faucet body of the automatic faucet.

In some embodiments, a kit for retrofitting an existing faucet to include remote activation may include a controller. In some embodiments, a kit for retrofitting an existing faucet to include remote activation may include using an existing controller. In some embodiments, the controller of a retrofit kit can include any features of controller 108 as described with respect to FIG. 1A, controller 108 as described with respect to FIG. 1B, and/or any features of controller 108 as described with respect to FIG. 2. For example, the controller may be wired to the activator and/or an electromechanical valve. In some embodiments, the controller may be wirelessly connected to the activator and/or an electromechanical valve. In some embodiments, the controller may be configured to receive a signal from the activator. The signal may be sent in response to a user input. In some embodiments, the controller may be configured to format the signal into a format that can be sent to an electromechanical valve. For example, the controller may be configured to convert the signal from an analog signal to a digital signal. The digital signal may then be sent to the electromechanical valve to open or close the valve. In some embodiments, the controller is configured to control the electromechanical valve by opening and/or closing the electromechanical valve. In some embodiments, the controller is powered with DC power, AC power, or a combination of AC and DC power. In some embodiments, the controller may include a battery box.

In some embodiments, a kit for retrofitting an existing faucet to include remote activation may include an electromechanical valve. For example, an electromechanical valve of a retrofit kit may include any features of electromechanical valve 106 as described with respect to faucet assembly 100 of FIG. 1A, electromechanical valve 106 as described with respect to faucet assembly 100 of FIG. 1B, and/or electromechanical valve 106 as described with respect to faucet assembly 100 of FIG. 2. In some embodiments, the electromechanical valve may be a part of an electromechanical valve assembly that includes a manifold configured to fluidly connect the electromechanical valve to an outlet hose using quick connections. In the case of retrofitting an automatic faucet, the electromechanical valve of the retrofit kit may be configured to replace the existing electromechanical valve of the automatic faucet.

A remote activation kit may be used to integrate an activator into an existing automatic faucet in some embodiments. For example, a remote activation kit can include an activator that can be wired or wirelessly connected to a controller of an existing automatic faucet. Once retrofitted, the activator can override any activation means (i.e., proximity or infrared sensor) already existing at the faucet body, for example. In some embodiments, retrofitting an automatic faucet may include replacing the existing electromechanical valve and the existing controller with the electromechanical valve and controller of the retrofit kit, which are properly wired or wirelessly connected to the activator of the retrofit kit.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

For any of the structural and functional characteristics described herein, methods of determining these characteristics are known in the art.

The invention claimed is:

1. An automatic faucet system comprising:
a faucet comprising a faucet body and a faucet spout;
an outlet hose in fluid communication with a cold water supply line, a hot water supply line, and the faucet spout;
an electromechanical valve fluidly coupled to the outlet hose and configured to control water flow to the faucet spout;
an activator separate from the faucet body and configured to be placed in a variety of positions during installation of the faucet system;
a controller configured to receive a first signal from the activator and, in response to the first signal, to control the electromechanical valve to control water flow to the spout; and
a manual mixing valve configured to be open or closed when water flows to the faucet spout,
wherein the automatic faucet system is configured to operate in an automatic mode and a manual mode, and when the automatic faucet system operates in the automatic mode, a user activates the automatic faucet system with the activator, and when the automatic faucet system operates in the manual mode, a user activates the automatic faucet using a handle or knob configured to control the manual mixing valve.

2. The automatic faucet system of claim 1, wherein the activator is configured to receive a user input, and, in response to the user input, the activator is configured to send the first signal to the controller.

3. The automatic faucet system of claim 1, wherein if the automatic faucet system is installed at a sink above a cabinet, the activator is configured to be installed on at least one of:
a toekick of the cabinet,
a top surface of a countertop proximate to a front edge of the sink, or
a face of the cabinet at a location that is from about 25% to about 75% a total distance measured between a bottom edge of the face of the cabinet and a top edge of the face of the cabinet.

4. The automatic faucet system of claim 1, wherein the activator comprises an infrared sensor, a proximity sensor, a capacitive sensor, a microwave sensor, or an ultrasonic sensor.

5. The automatic faucet system of claim 1, wherein the controller, in response to receiving the first signal, is configured to open the electromechanical valve to allow water to flow to the faucet body.

6. The automatic faucet system of claim 1, wherein the controller is configured to receive a second signal sent from the activator, and, in response to the second signal, is configured to close the electromechanical valve to stop flow of water to the faucet body.

7. The automatic faucet system of claim 1, wherein the activator and the electromechanical valve are in wireless communication the controller.

8. The automatic faucet system of claim 1, wherein the activator and the electromechanical valve are in wired electrical communication with the controller.

9. The automatic faucet system of claim 1, wherein the automatic mode is configured to be overridden by a user who activates the automatic faucet system with a handle or knob configured to control the manual mixing valve.

10. A kit for retro-fitting a manual faucet to an automatic faucet configured to have remote activation, the kit comprising:
an electromechanical valve configured to be fluidly coupled to a manual mixing valve of a manual faucet;
an activator configured to be placed in a variety of positions separate from the faucet during installation; and
a controller configured to be in electronic communication with the electromechanical valve and the activator,
wherein the controller is configured to receive a first signal from the activator, and, in response to the first signal, to control the electromechanical valve to control water flow to a faucet spout of the manual faucet, and wherein the retro-fitted automatic faucet is configured to operate in an automatic mode and a manual mode, and when the automatic faucet operates in the automatic mode, a user activates the automatic faucet with the activator, and when the automatic faucet system operates in the manual mode, a user activates the automatic faucet using a handle or knob configured to control the manual mixing valve.

11. The kit of claim 10, wherein the manual mixing valve is configured to be open or closed when water flows to the faucet spout of the manual faucet.

12. The kit of claim 10, wherein the electromechanical valve is configured to be fluidly coupled using a quick connect mechanism.

13. The kit of claim 10, wherein the activator is configured to receive a user input, and, in response to the user input, the activator is configured to send the first signal to the controller.

14. The kit of claim 10, wherein if the kit is installed at a sink above a cabinet, the activator is configured to be installed on:
a toekick of the cabinet,
a top surface of a countertop proximate to a front edge of the sink, or
a face of the cabinet at a location that is from about 25% to about 75% a total distance measured between a bottom edge of the face of the cabinet and a top edge of the face of the cabinet.

15. The kit of claim 10, wherein the activator comprises an infrared sensor, a proximity sensor, a capacitive sensor, a microwave sensor, or an ultrasonic sensor.

16. The kit of claim 10, wherein the controller is configured to receive a second signal sent from the activator, and, in response to the second signal, is configured to close the electromechanical valve to stop flow of water to the faucet body.

17. The kit of claim 10, wherein the activator and the electromechanical valve are in wireless communication the controller.

18. The kit of claim 10, wherein the activator and the electromechanical valve are in wired electrical communication with the controller.

19. The kit of claim 10, wherein the automatic mode is configured to be overridden by a user who activates the automatic faucet system with a handle or knob configured to control the manual mixing valve.

* * * * *